(12) United States Patent
Huang

(10) Patent No.: US 9,028,126 B2
(45) Date of Patent: May 12, 2015

(54) LED LIGHT BAR AND SIDE-EDGE BACKLIGHT MODULE USING SAME

(75) Inventor: Jianfa Huang, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 32 days.

(21) Appl. No.: 13/583,222

(22) PCT Filed: Jul. 6, 2012

(86) PCT No.: PCT/CN2012/078257
§ 371 (c)(1),
(2), (4) Date: Sep. 7, 2012

(87) PCT Pub. No.: WO2013/185395
PCT Pub. Date: Dec. 19, 2013

(65) Prior Publication Data
US 2013/0336000 A1    Dec. 19, 2013

(51) Int. Cl.
*F21V 7/04* (2006.01)
*F21V 8/00* (2006.01)
*F21V 21/00* (2006.01)

(52) U.S. Cl.
CPC .............. *G02B 6/0011* (2013.01); *F21V 21/00* (2013.01); *G02B 6/005* (2013.01); *G02B 6/0068* (2013.01); *G02B 6/0073* (2013.01)

(58) Field of Classification Search
CPC ........................... G02B 6/0068; G02B 6/0091
USPC ..................................... 362/600–634, 249.06
See application file for complete search history.

(56) References Cited

U.S. PATENT DOCUMENTS

| | | | | |
|---|---|---|---|---|
| 6,913,366 | B2* | 7/2005 | Lee | 362/628 |
| 7,350,955 | B2* | 4/2008 | Chang et al. | 362/612 |
| 7,646,450 | B2* | 1/2010 | Jung | 349/69 |
| 8,007,158 | B2* | 8/2011 | Woo et al. | 362/612 |
| 8,506,151 | B2* | 8/2013 | Park | 362/613 |
| 8,507,926 | B2* | 8/2013 | Weng et al. | 257/88 |
| 8,602,626 | B2* | 12/2013 | Lee et al. | 362/612 |
| 2003/0147257 | A1* | 8/2003 | Lee | 362/561 |
| 2007/0133227 | A1* | 6/2007 | Kuo | 362/613 |
| 2007/0153159 | A1* | 7/2007 | Jung | 349/69 |

(Continued)

FOREIGN PATENT DOCUMENTS

CN          201651946 U      11/2010

OTHER PUBLICATIONS

Machine translation of CN 201651946 U to Sun Haiwei.*

*Primary Examiner* — Anh Mai
*Assistant Examiner* — Zachary J Snyder
(74) *Attorney, Agent, or Firm* — Andrew C. Cheng

(57) ABSTRACT

An LED light bar includes a PCB and a plurality of LED lamps mounted to and electrically connected with the PCB. Each of the LED lamps has a light emission face that is perpendicular to the PCB. The LED lamps at two opposite ends are arranged to have the light emission faces thereof angularly shifted in directions away from the light emission faces of the LED lamps in the middle to thereby increase light irradiation range of the LED light bar. With the LED lamps at two ends of the LED light bar being arranged to have light emission faces thereof angularly shifted so as to form a predetermined included angle between the light emission faces of the LED lamps and a light incidence face of the light guide plate, the irradiation range of light from the LED light bar is increased.

8 Claims, 3 Drawing Sheets

(56) References Cited

U.S. PATENT DOCUMENTS

| | | |
|---|---|---|
| 2007/0230215 A1* | 10/2007 | Chang .......................... 362/613 |
| 2008/0106912 A1* | 5/2008 | Yeom ........................... 362/613 |
| 2008/0165551 A1* | 7/2008 | Okada et al. ................. 362/613 |
| 2008/0316767 A1* | 12/2008 | Woo et al. ..................... 362/612 |
| 2012/0106198 A1* | 5/2012 | Lin et al. ....................... 362/609 |
| 2012/0300494 A1* | 11/2012 | Watabe et al. ................ 362/602 |
| 2013/0010233 A1* | 1/2013 | Seo et al. ......................... 349/65 |

\* cited by examiner

LED LIGHT BAR AND SIDE-EDGE BACKLIGHT MODULE USING SAME

BACKGROUND OF THE INVENTION

1. Field of the Invention

The present invention relates to the field of liquid crystal displaying, and in particular to an LED (Light-Emitting Diode) light bar and a side-edge backlight module using the LED light bar.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel glass substrates and the liquid crystal molecules are controlled to change direction by application of electricity in order to refract light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal panel to form a planar light source that directly provides lighting to the liquid crystal panel. The side-edge backlight module arranges a backlight source of LED light bar at an edge of a back panel to be located rearward of one side of the liquid crystal panel. The LED light bar emits light that enters a light guide plate (LGP) through a light incident face of the light guide plate and is projected out through a light exit face of the light guide plate, after being reflected and diffused, to thereby transmit through an optic film assembly and form a planar light source for the liquid crystal panel.

In the conventional side-edge backlight module, due to the requirement for slim bezel, two sides of an LED light bar must be set inside the active area (display zone), and this leads to a dark zone at corners of the light guide plate. When 3D is realized through application of dynamic scanning mode, it often needs to include a micro-structured light guide plate that imposes confinement on light. Under this condition, the corner dark zone becomes severer for the length of the dark zone is increased. This severely affects the performance of displaying.

SUMMARY OF THE INVENTION

An object of the present invention is to provide an LED light bar, which realizes a backlight source that is free of corner dark zone for slim bezel designs and has a simple structure.

Another object of the present invention is to provide a side-edge backlight module, which realizes a slim bezel design of backlight module that is free of corner dark zone.

To achieve the above objects, the present invention provides an LED light bar, which comprises a PCB and a plurality of LED lamps mounted to and electrically connected with the PCB. Each of the LED lamps has a light emission face that is perpendicular to the PCB. The LED lamps at two opposite ends are arranged to have the light emission faces thereof angularly shifted in directions away from the light emission faces of the LED lamps in the middle to thereby increase light irradiation range of the LED light bar;

The plurality of LED lamps is sequentially lined up in such a way that the light emission faces thereof are located at the same side of the PCB.

The LED lamps in the middle are arranged to have the light emission faces thereof arranged in a straight line.

The LED lamps at the two opposite ends are multiple.

The light emission faces of the LED lamps at each of the two ends have extent of angular shifting that is gradually increased from inside to outside.

The present invention also provides an LED light bar, which comprises a PCB and a plurality of LED lamps mounted to and electrically connected with the PCB, each of the LED lamps having a light emission face that is perpendicular to the PCB, the LED lamps at two opposite ends being arranged to have the light emission faces thereof angularly shifted in directions away from the light emission faces of the LED lamps in the middle to thereby increase light irradiation range of the LED light bar;

wherein the plurality of LED lamps is sequentially lined up in such a way that the light emission faces thereof are located at the same side of the PCB;

wherein the LED lamps in the middle are arranged to have the light emission faces thereof arranged in a straight line;

wherein said LED lamps at the two opposite ends are multiple; and wherein the light emission faces of the LED lamps at each of the two ends have extent of angular shifting that is gradually increased from inside to outside.

The present invention also provides a side-edge backlight module, which comprises: a backplane, a light guide plate arranged inside the backplane, an LED light bar arranged inside the backplane. The light guide plate has a light incidence face. The LED light bar is set to correspond to the light incidence face. The LED light bar comprises: a PCB and a plurality of LED lamps mounted to and electrically connected with the PCB. Each of the LED lamps has a light emission face that is perpendicular to the PCB. The LED lamps at two opposite ends are arranged to have the light emission faces thereof angularly shifted in directions away from the light emission faces of the LED lamps in the middle, whereby light from said LED lamps at the two ends of the LED light bar irradiates corners of the light guide plate so as to realize a backlight module that is free of corner dark zone for slim bezel arrangements.

The backplane comprises a bottom plate and side plates connected to the bottom plate. The LED light bar is mounted to the bottom plate.

The plurality of LED lamps is sequentially lined up in such a way that the light emission faces thereof are located at the same side of the PCB and the light emission faces of the LED lamps in the middle are arranged to have the light emission faces thereof arranged in a straight line.

The LED lamps at the two opposite ends are multiple and the light emission faces of the LED lamps at each of the two ends have extent of angular shifting that is gradually increased from inside to outside.

The side-edge backlight module further comprises a reflector plate disposed at a bottom surface of the light guide plate and arranged on the bottom plate of the backplane and an optic film assembly arranged at top surface of the light guide plate.

The efficacy of the present invention is that the present invention provides an LED light bar and a side-edge backlight module using the light bar. With the LED lamps at two ends of the LED light bar being arranged to have light emission faces thereof angularly shifted so as to form a predetermined included angle between the light emission faces of the LED lamps and a light incidence face of the light guide plate, the irradiation range of light from the LED light bar is increased so that the light from the LED light bar may irradiate corners of the light guide plate thereby effectively eliminating the problem that dark zones are formed at corners of the light guide plate due to the conventional LED light bar is set inside a display zone. Thus, the quality of the backlight module is improved.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of one or more embodiments of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
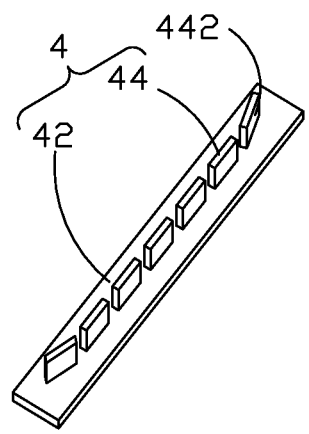
FIG. 1 is a perspective view showing an embodiment of an LED light bar according to the present invention.

As shown in FIG. 1, the present invention provides an LED (Light-Emitting Diode) light bar 4, which comprises a printed circuit board (PCB) 42 and a plurality of LED lamps 44 mounted to and electrically connected with the PCB 42. Each of the LED lamps 44 has a light emission face 442. The light emission face 442 is perpendicular to the PCB 42. The plurality of LED lamps 44 is sequentially lined up in such a way that the light emission faces 442 thereof are located at the same side of the PCB 42. The light emission faces 442 in the middle are arranged to have the light emission faces 442 thereof arranged in a straight line, while the LED lamps 44 at two opposite ends are arranged to have the light emission faces 442 thereof angularly shifted in directions away from the light emission faces 442 of the middle LED lamps 44 to thereby increase the light irradiation range of the LED light bar. Thus, light from the LED lamps 44 at the two ends of the LED light bar 4 may illuminate corners of the light guide plate without increasing the number of the LED lamps 44 of the LED light bar 4, so as to realize a backlight source that is free of corner dark zone for slim bezel designs. Further, with such an arrangement of the LED light bar 4 emitting light sideways, the LED light bar 4 can easily realize angular shifting of the light emission faces 442 of the LED lamps 44 at two ends. The structure is simple.

Figure 2:
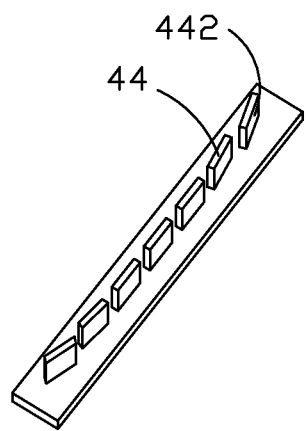
FIG. 2 is a perspective view showing another embodiment of an LED light bar according to the present invention.

In the instant embodiment, at each of the two ends, only one LED lamp 44 is arranged to have the light emission face 442 thereof angularly shifted outward. It is apparent that the number of LED lamps 44 of which the light emission faces are angularly shifted at the two ends can be determined as desired. As shown in FIG. 2, at each of the two ends, two LED lamps 44 are provided to have the light emission faces 442 thereof angularly shifted outward. In the case where multiple LED lamps 44 are arranged at each of the two ends to have the light emission faces 442 thereof angularly shifted outward, the extent of angular shifting of the light emission faces 442 at each of the two ends can be arranged to gradually increased from inside to outside. The extent of angular shifting is preferably such that the corners of the light guide plate can be sufficiently irradiated with no corner dark zone formed.

Figure 3:
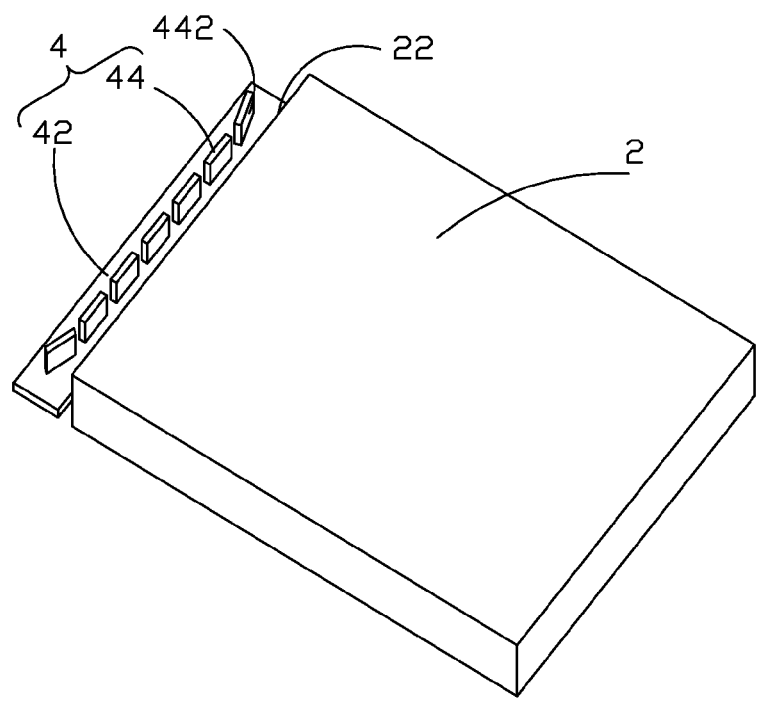
FIG. 3 is a perspective view illustrating an embodiment of side-edge backlight module according to the present invention.

As shown in FIG. 3, the present invention provides a side-edge backlight module, which comprises: a backplane (not shown), a light guide plate 2 arranged inside the backplane, and an LED light bar 4 arranged inside the backplane. The light guide plate 2 has a light incidence face 22. The LED light bar 4 is set to correspond to the light incidence face 22. The LED light bar 4 comprises a PCB 42 and a plurality of LED lamps 44 mounted to and electrically connected with the PCB 42. Each of the LED lamps 44 has a light emission face 442. The light emission face 442 is perpendicular to the PCB 42. The plurality of LED lamps 44 is sequentially lined up in such a way that the light emission faces 442 are located at the same side of the PCB 42. The LED lamps 44 in the middle are arranged to have the light emission faces 442 thereof arranged in a straight line, while the LED lamps 44 at two opposite ends are arranged to have the light emission faces 442 thereof angularly shifted in directions away from the light emission faces 442 of the middle LED lamps 44 to thereby increase the light irradiation range of the LED light bar. Thus, light from the LED lamps 44 at the two ends of the LED light bar 4 may illuminate corners of the light guide plate 2 without increasing the number of the LED lamps 44 of the LED light bar 4, so as to realize a backlight module that is free of corner dark zone for slim bezel designs. Further, with such an arrangement of the LED light bar 4 emitting light sideways, the LED light bar 4 can easily realize an arrangement o angular shifting of the light emission faces 442 of the LED lamps 44 at two ends. The structure is simple. Thus, the present invention effectively eliminates the problem that dark zones are formed at corners of a light guide plate caused by LED light bar set inside a display zone, thereby improving the quality of backlight module.

The backplane comprises a bottom plate (not shown) and side plates (not shown) connected to the bottom plate. The LED light bar 4 is mounted to the bottom plate. The side-edge backlight module further comprises a reflector plate (not shown) disposed at the bottom surface of the light guide plate 2 and arranged on the bottom plate of the backplane and an optic film assembly (not shown) arranged at the top surface of the light guide plate 2.

Figure 4:
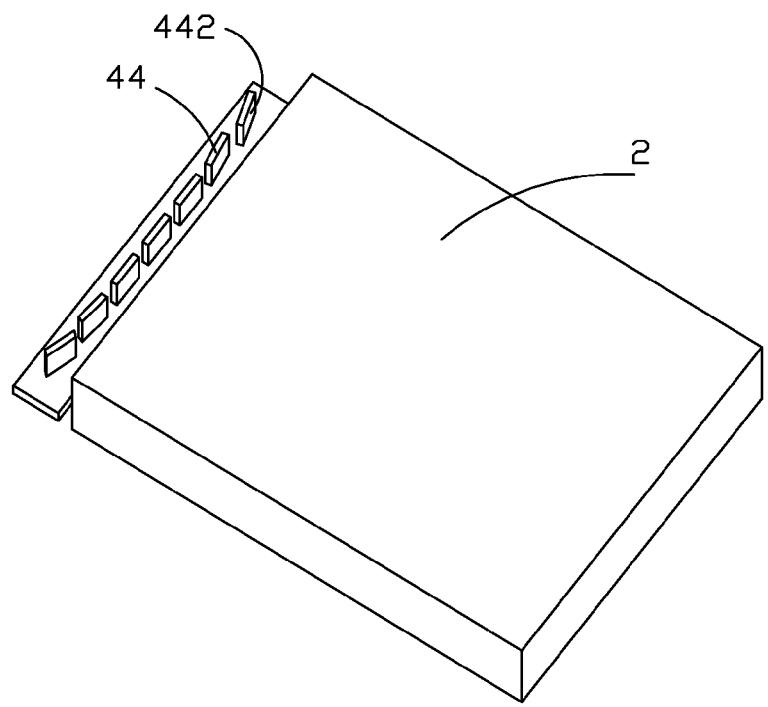
FIG. 4 is a perspective view showing another embodiment of side-edge backlight module according to the present invention.

In the instant embodiment, at each of the two ends, only one LED lamp 44 is arranged to have the light emission face 442 thereof angularly shifted outward. It is apparent that the number of LED lamps 44 of which the light emission faces are angularly shifted at the two ends can be determined as desired. As shown in FIG. 4, at each of the two ends, two LED lamps 44 are provided to have the light emission faces 442 thereof angularly shifted outward. In the case where multiple LED lamps 44 are arranged at each of the two ends to have the light emission faces 442 thereof angularly shifted outward, the extent of angular shifting of the light emission faces 442 at each of the two ends can be arranged to gradually increased from inside to outside. The extent of angular shifting is preferably such that the corners of the light guide plate can be sufficiently irradiated with no corner dark zone formed.

In summary, the present invention provides an LED light bar and a side-edge backlight module using the light bar. With the LED lamps at two ends of the LED light bar being arranged to have light emission faces thereof angularly shifted so as to form a predetermined included angle between the light emission faces of the LED lamps and a light incidence face of the light guide plate, the irradiation range of light from the LED light bar is increased so that the light from the LED light bar may irradiate corners of the light guide plate thereby effectively eliminating the problem that dark zones are formed at corners of the light guide plate due to the conventional LED light bar is set inside a display zone. Thus, the quality of the backlight module is improved.

Based on the description given above, those having ordinary skills of the art may easily contemplate various changes and modifications of the technical solution and technical ideas of the present invention and all these changes and modifications are considered within the protection scope of right for the present invention.

What is claimed is:

1. An LED light bar adapted to emit light to irradiate a light incidence face of a light guide plate, the LED light bar comprising a PCB and a plurality of LED lamps mounted to and electrically connected with the PCB, each of the LED lamps having a light emission face that is perpendicular to the PCB, the LED lamps in a middle portion of the LED light bar being arranged to have the light emission faces thereof arranged in a straight line corresponding to the light incidence face of the light guide plate, the LED lamps at two opposite ends of the LED light bar being arranged to have the light emission faces thereof angularly shifted in directions away from the light emission faces of the LED lamps in the middle portion to thereby have the LED lamps at the two opposite ends of the LED light bar facing away from each other to increase light irradiation range of the LED light bar for outward divergence to cover corners of the light incidence face of the light guide plate, wherein the light emission faces of the LED lamps at each of the two ends have extent of angular shifting that is gradually increased from inside to outside.

2. The LED light bar as claimed in claim 1, wherein the plurality of LED lamps is sequentially lined up in such a way that the light emission faces thereof are located at the same side of the PCB.

3. The LED light bar as claimed in claim 1, wherein the number of said LED lamps at each of the two opposite ends is plural and the plural LED lamps at each of the two opposite ends are angularly shifted with respect to the light emission faces of the LED lamps in the middle portion.

4. An LED light bar adapted to emit light to irradiate a light incidence face of a light guide plate, the LED light bar comprising a PCB and a plurality of LED lamps mounted to and electrically connected with the PCB, each of the LED lamps having a light emission face that is perpendicular to the PCB, the LED lamps in a middle portion of the LED light bar being arranged to have the light emission faces thereof arranged in a straight line corresponding to the light incidence face of the light guide plate, the LED lamps at two opposite ends of the LED light bar being arranged to have the light emission faces thereof angularly shifted in directions away from the light emission faces of the LED lamps in the middle portion to thereby have the LED lamps at the two opposite ends of the LED light bar facing away from each other to increase light irradiation range of the LED light bar for outward divergence to cover corners of the light incidence face of the light guide plate;

wherein the plurality of LED lamps is sequentially lined up in such a way that the light emission faces thereof are located at the same side of the PCB;

wherein said LED lamps at the two opposite ends are multiple; and wherein the light emission faces of the LED lamps at each of the two ends have extent of angular shifting that is gradually increased from inside to outside.

5. A side-edge backlight module, comprising: a backplane, a light guide plate arranged inside the backplane, an LED light bar arranged inside the backplane, the light guide plate having a light incidence face, the LED light bar being set to correspond to the light incidence face, the LED light bar comprising: a PCB and a plurality of LED lamps mounted to and electrically connected with the PCB, each of the LED lamps having a light emission face that is perpendicular to the PCB, the LED lamps in a middle portion of the LED light bar being arranged to have the light emission faces thereof arranged in a straight line corresponding to the light incidence face of the light guide plate, the LED lamps at two opposite ends of the LED light bar being arranged to have the light emission faces thereof angularly shifted in directions away from the light emission faces of the LED lamps in the middle to have the LED lamps at the two opposite ends of the LED light bar facing away from each other, whereby light from said LED lamps at the two ends of the LED light bar outward diverge to irradiate corners of the light incidence face of the light guide plate so as to realize a backlight module that is free of corner dark zone for slim bezel arrangements;

wherein said LED lamps at the two opposite ends are multiple and the light emission faces of the LED lamps at each of the two ends have extent of angular shifting that is gradually increased from inside to outside.

6. The side-edge backlight module as claimed in claim 5, wherein the backplane comprises a bottom plate and side plates connected to the bottom plate, the LED light bar being mounted to the bottom plate.

7. The side-edge backlight module as claimed in claim 5, wherein the plurality of LED lamps is sequentially lined up in such a way that the light emission faces thereof are located at the same side of the PCB.

8. The side-edge backlight module as claimed in claim 6 further comprising a reflector plate disposed at a bottom surface of the light guide plate and arranged on the bottom plate of the backplane and an optic film assembly arranged at top surface of the light guide plate.

* * * * *